United States Patent [19]

Yamamoto

[11] Patent Number: 4,654,485

[45] Date of Patent: Mar. 31, 1987

[54] SINGLE FREQUENCY REMOTE CONTROL OF TELEPHONE ANSWERING DEVICE ACCOMPLISHES SEVERAL FUNCTIONS DEPENDENT ON THE PRESENT STATE OF THE DEVICE

[75] Inventor: Tadashi Yamamoto, Chiba, Japan

[73] Assignee: Sony Corporation, Tokyo, Japan

[21] Appl. No.: 725,815

[22] Filed: Apr. 22, 1985

[30] Foreign Application Priority Data

Apr. 26, 1984 [JP] Japan ................................. 59-84896

[51] Int. Cl.[4] ............................................. H04M 1/64
[52] U.S. Cl. ....................................... 379/73; 379/76; 379/77
[58] Field of Search ...................... 179/6.07, 6.11, 6.10

[56] References Cited

U.S. PATENT DOCUMENTS

| 4,005,270 | 1/1977 | Darwood | 179/6.1 |
| 4,306,117 | 12/1981 | Jacobson | 179/6.1 |
| 4,436,959 | 3/1984 | Nakatsuyama et al. | 179/6.11 |
| 4,549,046 | 10/1985 | Mock et al. | 179/6.11 |

Primary Examiner—Raymond F. Cardillo
Assistant Examiner—James E. Tomassini
Attorney, Agent, or Firm—Hill, Van Santen, Steadman & Simpson

[57] ABSTRACT

This invention relates to an automatic telephone answering apparatus which has a record/play head, a play means, a record means, a fast forward means, a rewind means, a detecting means for detecting a remote control signal supplied through telephone lines, and a tape position detecting means. When the remote control signal is detected during playback of an outgoing message prerecorded on the tape, the tape is fast forwarded to a predetermined position, and the apparatus is set in the play mode. During playback, when the remote control signal is detected, the tape is rewound to the beginning of the outgoing message, and the apparatus is set in the record mode to record a new outgoing message. After the new outgoing message is recorded to the predetermined position, the tape is rewound to the beginning of the outgoing message, and the apparatus is set in the play mode. During playback, when the remote control signal is detected, the corresponding tape position is detected, thereby preventing the remote control signal from being recorded at the end of the new outgoing message.

9 Claims, 6 Drawing Figures 4,654,485

SINGLE FREQUENCY REMOTE CONTROL OF TELEPHONE ANSWERING DEVICE ACCOMPLISHES SEVERAL FUNCTIONS DEPENDENT ON THE PRESENT STATE OF THE DEVICE

BACKGROUND OF THE INVENTION

1. Field of the Invention

The present invention relates to an automatic telephone answering apparatus for recording an incoming message in a tape recorder while a called party is out.

2. Description of the Prior Art

In a conventional automatic telephone answering apparatus, a response message prerecorded in an outgoing message tape is played upon reception of an incoming call to tell a calling party to record his message and thereafter record an incoming message.

A conventional automatic telephone answering apparatus of this type is proposed in Japanese Patent Publication No. 77483/1980 wherein the response message (to be referred to as an OGM (outgoing message) hereinafter) and a message (to be referred to as an ICM (incoming message) hereinafter) of a calling party are recorded in a single tape. FIG. 1 shows a format of the tape used in the above prior art.

Referring to FIG. 1, an OGM is recorded in a tape 1 from a point $N_0$ to a point $N_1$ for 60 seconds. An alarm portion is formed in a predetermined tape portion between the point $N_1$ and a point $N_2$ wherein an alarm signal is recorded. Incoming messages ①, ②, ..., and ⓝ are sequentially recorded through the corresponding alarm portions. In the automatic telephone answering apparatus using this tape 1, a record/play head is aligned with the point $N_0$ as the beginning of the OGM and waits for an incoming call. Upon reception of an incoming call, the apparatus is set in the play mode and the OGM is played. Then the already recorded ICMs are fast forwarded. Thereafter, the incoming call is newly recorded from a predetermined position. After the ICM is recorded, the tape 1 is rewound to the point $N_0$ and waits for a next incoming call. It should be noted that the points $N_0$ to $N_n$ represent addresses on the tape and are obtained by detecting the number of revolutions of the reel. The revolution number data is stored in a memory and used for controlling tape travel.

In a conventional automatic telephone answering apparatus using the tape 1 and subjected to remote control, a subscriber, i.e., a called party makes a phone call to this telephone from a remote location. The subscriber sends a remote control signal with a predetermined frequency to this telephone answering apparatus through telephone lines, thereby setting the apparatus in the play mode. All ICMs recorded while he is out can be reproduced through the telephone lines. Another conventional automatic telephone answering apparatus is known wherein the content of the OGM can be updated. Besides telling the calling party to record his message, the OGMs tell him also where the called party is staying, when he will return home, and the like. Therefore, the subscriber often wishes to update the OGM.

In the conventional automatic telephone answering apparatus capable of updating the content of the OGM with remote control operation, it is difficult to terminate a new OGM within a predetermined period of time (e.g., 60 seconds). When a new OGM is completely recorded and a remote control signal is sent to designate the end point of this OGM, the remote control signal is recorded on the tape. When another calling party makes a phone call to the apparatus, the head detects the remote control signal in the play mode of the OGM. Meanwhile, in the apparatus subjected to remote control, when the called party listens to the already recorded ICMs with a remote control operation from a remote location, the OGM is first played upon reception of the incoming call. When the remote control signal is sent while the apparatus is set in the OGM play mode, the apparatus is immediately set in the ICM play mode, so that the ICMs ①, ②, ..., and ⓝ sequentially played and the subscriber can hear the recorded incoming calls. When the recorded remote control signal is detected in the OGM play mode upon reception of a phone call of a third party excluding the subscriber, the apparatus is erroneously set in the ICM play mode, and the third party can hear the already recorded ICMs ① to ⓝ. For this reason, the subscriber cannot send a remote control signal when a new OGM is completely recorded in the conventional automatic telephone answering apparatus. Even if an OGM is completely recorded in a time shorter than 60 seconds, the tape must be driven as a blank portion for the remaining time. When a period of 60 seconds has elapsed, the record mode can then be cancelled. Therefore, the calling party hears a meaningless voice of the old OGM or no sounds for the remaining time when listening to an OGM. During the remaining time, the calling party must wait to no purpose.

In order to solve the above problem, an OGM updating remote control signal can be separately prepared. However, even in that case a remote control signal is recorded on the tape and the playback sound of the signal is heard by the calling party. The playback sound is essentially of no significance to the calling party, however, the calling party may mistakenly believe that the playback sound of the remote control signal is an alarm sound notifying him to record his message. The OGM updating remote control signal also complicates the circuit arrangement.

SUMMARY OF THE INVENTION

It is an object of the present invention to provide an automatic telephone answering apparatus wherein without recording a remote control signal at an end point of an updated new OGM the end point can be detected when the OGM is to be updated.

It is another object of the present invention to provide an automatic telephone answering apparatus wherein a calling party can start to record his ICM immediately after playing of a new OGM end when the new OGM is recorded for a time shorter than a predetermined time.

It is still another object of the present invention to provide an automatic telephone answering apparatus wherein a system failure cannot occur to allow any third party to hear already recorded ICMs.

It is still another object of the present invention to provide an automatic telephone answering apparatus wherein a new OGM can be played and checked without recalling from a telephone.

DETAILED DESCRIPTION OF THE PREFERRED EMBODIMENT

Figure 1:
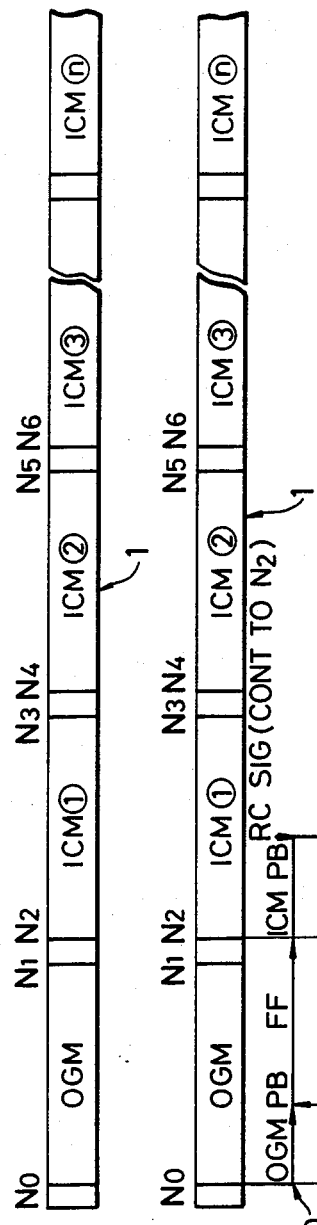
FIG. 1 is a format of a tape to which the present invention is applied.
Figure 2:
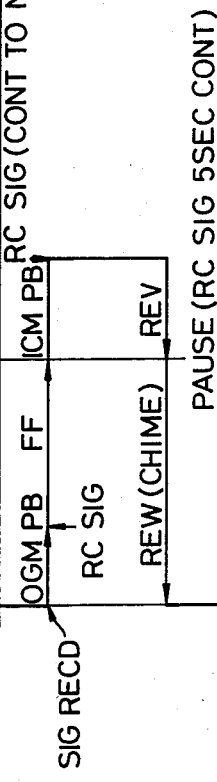
FIG. 2 is a chart for explaining the operation of an automatic telephone answering apparatus according to an embodiment of the present invention.

A case will be described wherein a subscriber wishes to update an OGM from a remote location by using a remote control signal.

When the subscriber makes a phone call from the remote location, the corresponding automatic telephone answering apparatus detects an incoming call, and the apparatus is set in the play mode to begin playing. While the OGM is being played the subscriber sends a remote control signal through a handset. The remote control signal can be a conventional remote control signal. Upon reception of the remote control signal, the apparatus sends a beep tone indicating the reception back to the subscriber, and at the same time, the tape is fast forwarded (FF). The record/play head reaches the point $N_2$ as the beginning of the ICM ① recorded firstly, and thus the apparatus is set in the ICM play mode. When the normal remote control play mode is performed, the ICMs ① to ⓝ are sequentially played, so that the playback sound reaches to the subscriber through the telephone lines. The subscriber sends a remote control signal again to update the OGM. The tape is rewound in the review mode to the point $N_2$. During rewinding, the subscriber keeps sending the remote control signal by continuous depression of a button of a remote controller. During rewinding, the beep tone is continuously sent to the subscriber. When the record/play head reaches the point $N_2$, the tape is stopped in the pause mode. In this case, when the remote control signal is stopped, the apparatus is set in the ICM play mode again, so that playing of the ICM ① begins. However, when the subscriber wishes to update the OGM, he must keep sending the remote control signal.

When the remote control signal is continuously sent for, for example, 5 seconds in the pause mode, the tape is rewound from the point $N_2$ to the point $N_0$. Meanwhile, the remote control signal is continuously sent, and the chime is sent in place of the beep tone to the subscriber, thereby signalling to the subscriber that the tape is being rewound for the OGM region. When the point $N_0$ of the tape is aligned with the record/play head, the beep tone is replaced with the chime again to await stopping of the remote control signal. When the subscriber hears the beep tone and releases his finger from the button of the remote controller to stop sending the remote control signal, the apparatus is then set in the record mode, and the tape travel is started. In this manner, the apparatus is set in the record mode after the remote control signal is stopped, as described above, so that the remote control signal will not be recorded on the tape.

The subscriber records a new OGM through the telephone lines. Even if recording is completed in a time shorter than 60 seconds, the tape is continuously driven until the point $N_2$ is aligned with the record/play head. When the point $N_2$ is aligned with the record/play head, the tape is rewound until the point $N_0$ is aligned with the record/play head. When the point $N_0$ is aligned with the record/play head, the apparatus is set in the play mode. The newly recorded OGM can be played and checked. The subscriber listens to the playback sound through the telephone lines and sends the remote control signal at the end point of the new OGM. When the apparatus receives the remote control signal, a tape point $N_m$ is detected at this moment and is stored. At the same time, the tape is rewound until the point $N_0$ is aligned with the record/play head, and the apparatus is set in the standby mode for receiving the next incoming call. When the next incoming call is received, the new OGM is played. Furthermore, since an end point $N_m$ of a new OGM is stored, a new ICM can be recorded immediately after the point $N_m$ or at a predetermined portion after the point $N_m$. As described above, since the remote control signal is sent to detect the point $N_m$ while the new OGM is being played and checked, this remote control signal will not be recorded on the tape. Although the new OGM is played and checked by recalling from a telephone in the conventional apparatus, recalling need not be performed in the apparatus according to the embodiment of the present invention.

Figure 3:
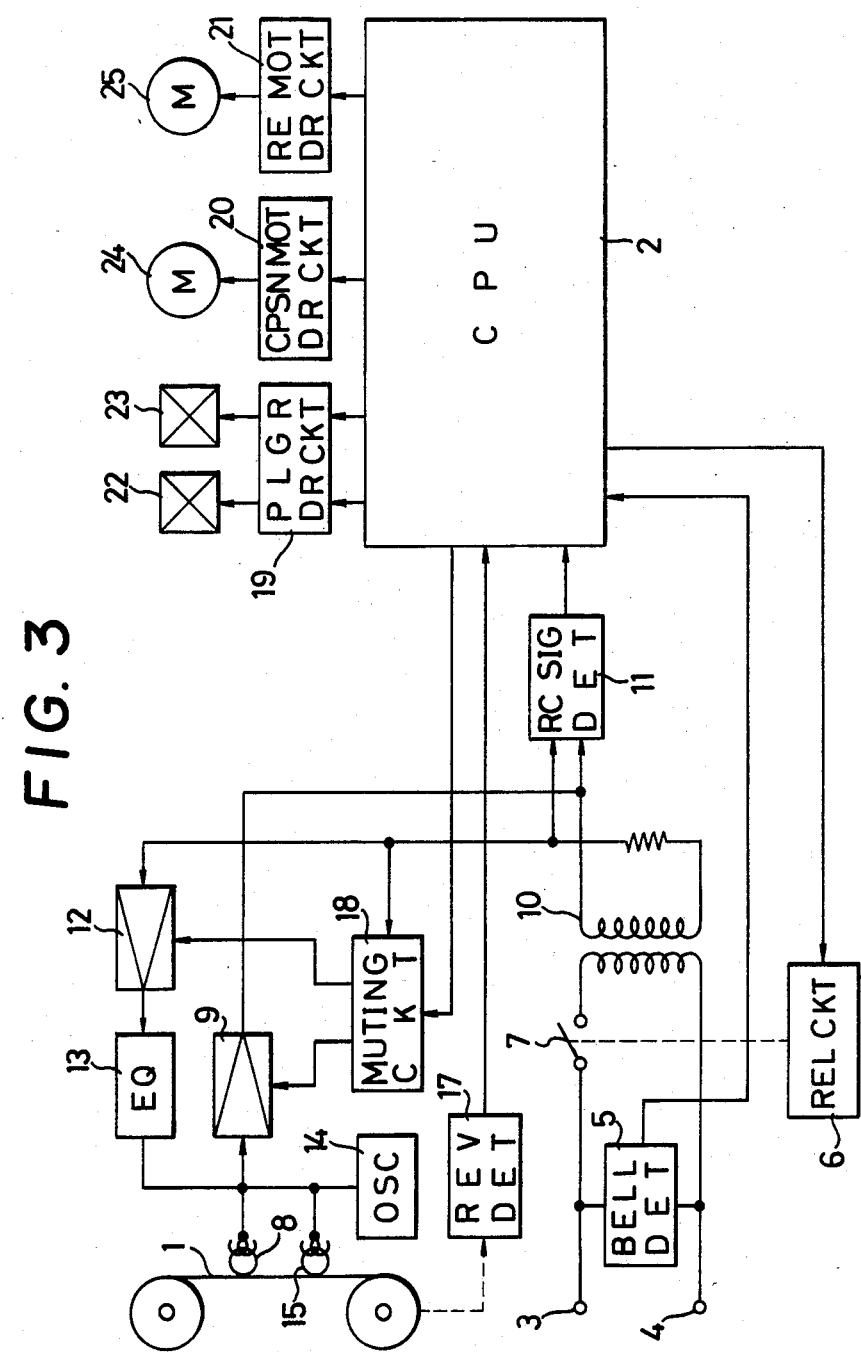
FIG. 3 is a block diagram of the automatic telephone answering apparatus according to the embodiment of the present invention.

The circuit arrangement of the automatic telephone answering apparatus to perform the operations described above will be described hereinafter with reference to FIG. 3.

In the apparatus, all operations described above are performed automatically in accordance with instructions generated from a microcomputer (CPU) 2. FIG. 3 shows a peripheral circuit arrangement which gives instructions to the CPU 2 or which is operated by instructions from the CPU 2.

When OGM updating is to be performed, a signal of a ringing tone is supplied to terminals 3 and 4 upon reception of an incoming call from the subscriber. The signal is detected by a ringing tone detector 5. When a detection signal is supplied from the ringing detector 5 to the CPU 2, a relay circuit 6 is energized to close a switch 7, thereby engaging the apparatus with the telephone lines. When the OGM is played by a record/play head 8 from a tape 1, the playback signal is sent to the subscriber through the head 8, an amplifier 9, a transformer 10 and the telephone lines. When the remote control signal is sent back from the subscriber through the telephone lines during OGM playing, the signal is detected by a remote control signal detector 11. As described above, when the remote control signal is continuously sent, the tape 1 is rewound until the point $N_0$ is aligned with the record/play head. The apparatus is set in the record mode after the remote control signal is stopped. Under this condition, a new OGM speech signal is sent from the subscriber through the telephone lines. The speech signal is received by the terminals 3 and 4 and applied to the head 8 through the transformer 10, an amplifier 12 and an equalizer 13. The speech signal is then recorded by the head 8 on the tape 1. In this case, a bias oscillator 14 is operated to cause a bias current to flow in the head 8. It should be noted that an erase current flows in an erase head 15 when a message is to be erased.

When a new OGM is completely recorded, the tape 1 is driven until the point $N_2$ is aligned with the record/play head. The tape 1 is then rewound again until the point $N_0$ is aligned with the record/play head, thereby setting the apparatus in the play mode. A playback signal of the new OGM is sent to the subscriber through the amplifier 9 and the transformer 10. When the subscriber sends the remtote control signal at the end of the new OGM, this signal is detected by the detector 11. The point $N_m$ is detected in accordance with the detection signal from the detector 11. $N_m$ detection is performed by a revolution number detector 17 which detects the number of revolutions of a take-up reel 16. The tape 1 is rewound until the point $N_0$ is aligned with the record/play head, and the apparatus is set in the standby state. It should be noted that the amplifiers 9 and 12 are muted at a predetermined timing under the control of a muting circuit 18 in accordance with an instruction from the CPU 2.

The CPU 2 also controls operations of a plunger driver 19, a capstan motor driver 20, a reel motor driver 21, and the like, so that a forward plunger 22, a fast forward and rewind plunger 23, a capstan motor 24 and a reel motor 25, and the like are operated at predetermined timings.

Figure 4:
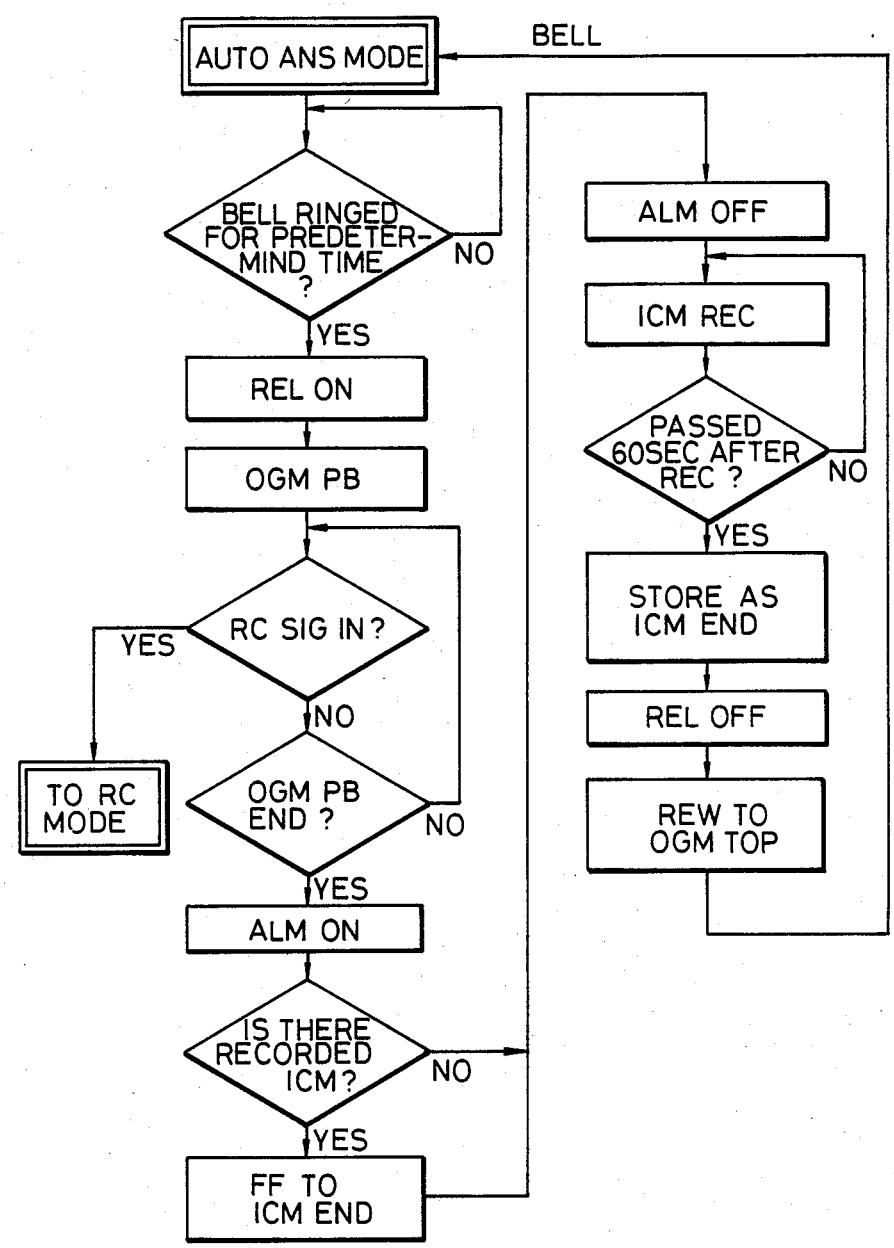
FIG. 4 is a flow chart for executing an automatic telephone answering mode.
Figure 5A:
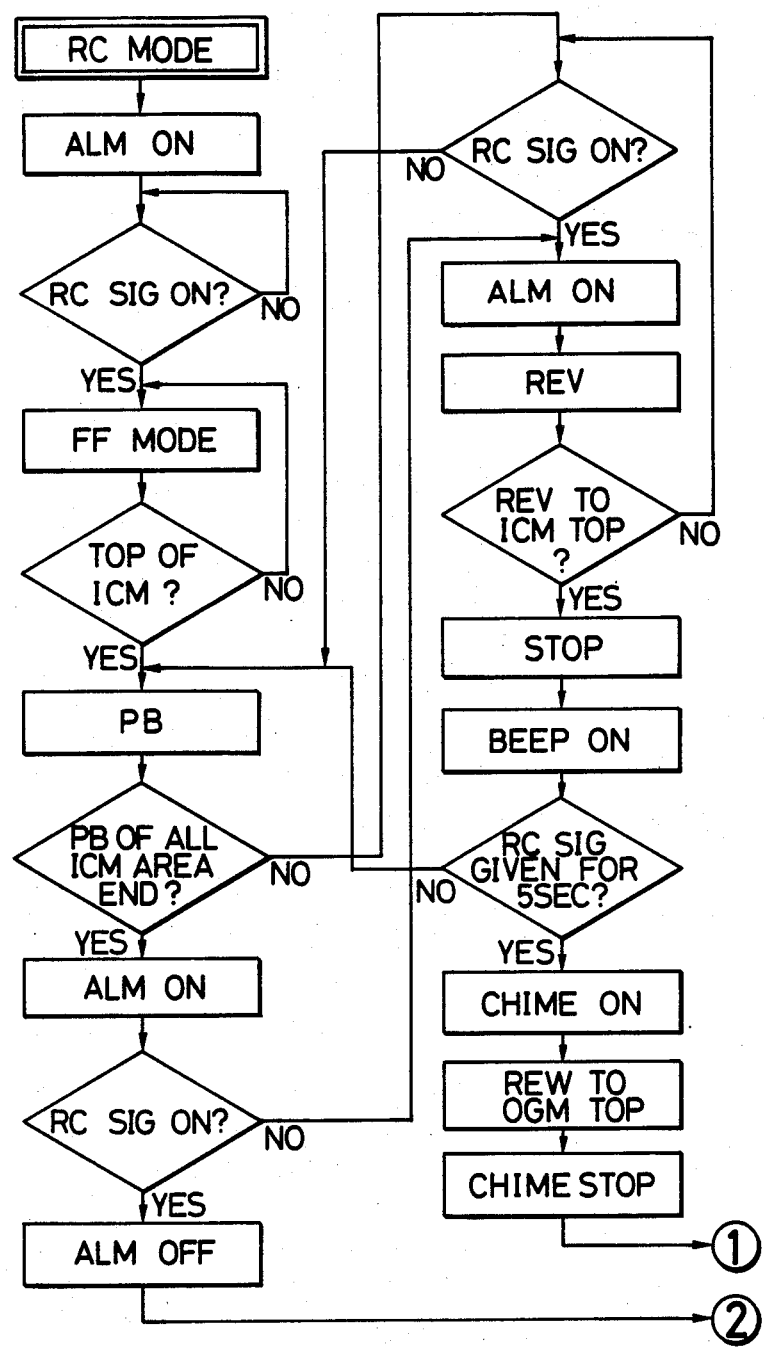
FIGS. 5A and 5B are respectively halves of a flow chart for executing the remote control mode.
Figure 5B:
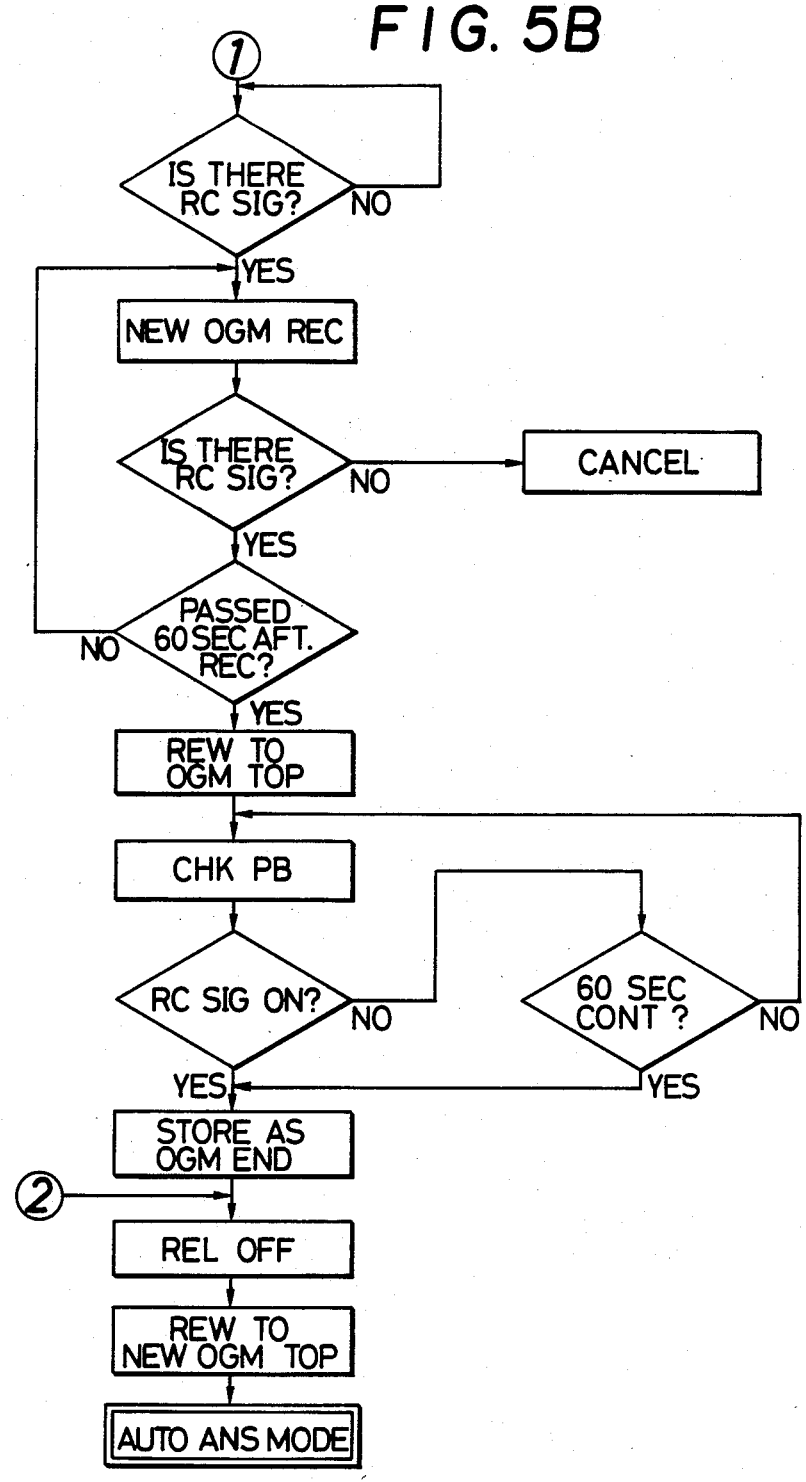

FIG. 4 is a flow chart for executing the normal automatic response mode, i.e., mode wherein the ICM is recorded after the OGM is sent to the calling party. FIGS. 5A and 5B are respectively halves of a flow chart for executing the remote control mode (i.e., modes including the ICM play mode and the OGM updating mode) upon reception of the remote control signal when the OGM is being played in the flow shown in FIG. 4.

What is claimed is:

1. An automatic telephone answering apparatus comprising:
    (a) a single magnetic tape having an outgoing message region for recording an outgoing message to be played to a calling party and an incoming message region for sequentially recording incoming messages from the calling party, said outgoing message region being located at a beginning of said single magnetic tape and said incoming message region being located at an end of said outgoing message region;
    (b) a magnetic head for recording a signal on said magnetic tape and reproducing the signal therefrom;
    (c) record mode means for causing said magnetic head to record the signal on said magnetic tape and forwarding said magnetic tape at a normal speed;
    (d) play mode means for causing said magnetic head to reproduce the signal from said magnetic tape and forwarding said magnetic tape at the normal speed;
    (e) fast forward mode means for fast forwarding said magnetic tape;
    (f) rewind mode means for rewinding said magnetic tape;
    (g) position detecting means for detecting a position of said magnetic tape;
    (h) signal detecting means for detecting a remote control signal sent through telephone lines; and
    (i) control means for selectively operating said play mode means, said record mode means, said fast forward mode means and said rewind mode means in response to said signal detecting means, said apparatus further comprising:
    (j) means for fast forwarding said magnetic tape to a first position when a first remote control signal sent through the telephone lines is detected during a first play mode for playing a first outgoing message prerecorded on said magnetic tape upon reception of an incoming message, and thereafter for setting said apparatus in a second play mode;
    (k) means for rewinding said magnetic tape to a second position upon detection of a second remote control signal sent through the telephone lines during the second play mode, and thereafter setting said apparatus in a record mode;
    (l) means for recording a second outgoing message sent through the telephone lines in the record mode on said outgoing message region of said magnetic tape; and
    (m) means for rewinding said magnetic tape to the second position when said magnetic tape reaches the end of said outgoing message region in the record mode, and for setting said apparatus in a third play mode from the second position;
    (n) whereby a position of said magnetic tape upon detection of a third remote control signal sent through the telephone lines during the third play mode is detected by said position detecting means as a third position and stored.

2. An apparatus according to claim 1, wherein the first position is the end of said outgoing message region or a beginning of said incoming message region.

3. An apparatus according to claim 1, wherein the second position is a beginning of said outgoing message region.

4. An apparatus according to claim 1, wherein the third position is an end of said second outgoing message.

5. An apparatus according to claim 1, wherein after the third position is detected, said magnetic tape is rewound to the second position, and thereafter said apparatus is set in a standby mode.

6. An apparatus accoridng to claim 1, wherein the first, second and third remote control signals respectively comprise signals having an identical frequency.

7. An apparatus according to claims 1 or 6, wherein the second remote control signal comprises a continuous signal, said magnetic tape being rewound to the second position upon detection of the continuous signal for longer than a predetermined period of time.

8. An apparatus according to claim 7, wherein the continuous signal as the second remote control signal is detected for longer than the predetermined period of time when said apparatus is set at the first position in a pause mode.

9. An apparatus according to claim 1, wherein said outgoing message region is played in the first and third play modes, and said incoming message region is played in the second play mode.

* * * * *